(12) United States Patent
Donaldson et al.

(10) Patent No.: US 10,708,054 B2
(45) Date of Patent: Jul. 7, 2020

(54) SECURE MICROFORM

(71) Applicants: James Donaldson, Belfast (GB); Bartlomiej Prokop, Belfast (GB); Rhidian John, Belfast (GB); Thomas Looney, Belfast (GB)

(72) Inventors: James Donaldson, Belfast (GB); Bartlomiej Prokop, Belfast (GB); Rhidian John, Belfast (GB); Thomas Looney, Belfast (GB)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 241 days.

(21) Appl. No.: 15/782,301

(22) Filed: Oct. 12, 2017

(65) Prior Publication Data

US 2019/0116037 A1    Apr. 18, 2019

(51) Int. Cl.
*H04L 9/32* (2006.01)
*H04L 9/14* (2006.01)
(Continued)

(52) U.S. Cl.
CPC ............ *H04L 9/3213* (2013.01); *G06F 21/51* (2013.01); *G06F 21/602* (2013.01); *H04L 9/14* (2013.01);
(Continued)

(58) Field of Classification Search
CPC ....... H04L 9/3213; H04L 9/14; H04L 9/3234; H04L 9/3247; H04L 2209/60; G06F 21/51; G06F 21/602
See application file for complete search history.

(56) References Cited

U.S. PATENT DOCUMENTS 8,639,629 B1   1/2014  Hoffman
8,972,339 B2   3/2015  Aparicio
(Continued)

FOREIGN PATENT DOCUMENTS

JP     2004259117      9/2004
WO    03060449 A1      7/2003
(Continued)

OTHER PUBLICATIONS

Wang et. al. "Mobile Payment Security, Threats, and Challenges", 2016 Second International Conference on Mobile and Secure Services (MobiSecServ), Mar. 24, 2016 (Year: 2016).*
(Continued)

*Primary Examiner* — Eleni A Shiferaw
*Assistant Examiner* — Bassam A Noaman
(74) *Attorney, Agent, or Firm* — Loeb & Loeb LLP

(57) ABSTRACT

A secure iframe and a combination of security elements are used in rendering a web page of a content provider. The security elements may be both pre-provisioned and executed in real time to allow a third party to securely collect sensitive information while allowing the content provider to retain total control of the look and feel of the web page. A microform within the secure iframe uses a combination of Content Security Policies (CSP), HSTS, and HPKP to generate a secure connection between the iframe and the third party while still allowing the content provider control the look and feel of the iframe. The content provider never handles the sensitive data, reducing the content provider's financial exposure in the event of a data breach. The secure service collects sensitive data and returns a tokenized identifier for use by the content provider when interacting with the customer.

18 Claims, 6 Drawing Sheets

(51) Int. Cl.
*G06F 21/60* (2013.01)
*G06F 21/51* (2013.01)

(52) U.S. Cl.
CPC .......... *H04L 9/3234* (2013.01); *H04L 9/3247* (2013.01); *H04L 2209/60* (2013.01)

(56) References Cited

U.S. PATENT DOCUMENTS

| | | | |
|---|---|---|---|
| 9,064,394 B1 | 6/2015 | Trundle | |
| 10,496,808 B2* | 12/2019 | Van Os | .................... G06F 21/31 |
| 2005/0281237 A1 | 12/2005 | Heinonen | |
| 2008/0082627 A1* | 4/2008 | Allen | .................... G06Q 10/10 |
| | | | 709/217 |
| 2008/0183714 A1 | 7/2008 | Nakhjiri | |
| 2009/0164275 A1 | 6/2009 | Chen | |
| 2010/0010317 A1 | 1/2010 | De | |
| 2010/0185871 A1 | 7/2010 | Scherrer | |
| 2012/0249749 A1 | 10/2012 | Stavnitzky | |
| 2013/0252583 A1 | 9/2013 | Brown | |
| 2013/0268766 A1 | 10/2013 | Schrecker | |
| 2013/0290203 A1* | 10/2013 | Purves | .................... G06Q 50/01 |
| | | | 705/319 |
| 2014/0089201 A1* | 3/2014 | Jakulin | .............. G06Q 20/1235 |
| | | | 705/64 |
| 2014/0143145 A1 | 5/2014 | Kortina | |
| 2015/0207695 A1 | 7/2015 | Varney | |
| 2016/0277421 A1* | 9/2016 | Lahoz | ................. G06F 21/6245 |
| 2016/0283935 A1* | 9/2016 | Girish | ................... G06F 16/951 |
| 2017/0061129 A1 | 3/2017 | Bektchiev | |
| 2017/0228711 A1 | 8/2017 | Chawla | |
| 2017/0264603 A1 | 9/2017 | Faith | |
| 2018/0174137 A1* | 6/2018 | Subbarayan | ....... G06Q 20/3674 |

FOREIGN PATENT DOCUMENTS

| | | |
|---|---|---|
| WO | 2009145987 A2 | 12/2009 |
| WO | 2013163326 | 10/2013 |

OTHER PUBLICATIONS

Jawale et. al. "A Security Analysis on Apple Pay", 2016 European Intelligence and Security Informatics Conference (EISIC), Mar. 6, 2017 (Year: 2017).*
Japanese Office Action (with English language translation) dated Dec. 28, 2018 for Application No. 2016-563065, 7 pages.
International Search Report and Written Opinion for PCT/US18/40789 dated Jan. 24, 2019, 15 pages.
International Search Report and Written Opinion for PCT/US2015/033214, dated Dec. 6, 2016. (pp. 1-5).
International Searching Authority, International Search Report and Written Opinion in International Application No. PCT/US15/33214, dated Sep. 2, 2015, 13 pages.
English language translation of Chinese Office Action for Application No. CN201580028431.1, dated Jul. 30, 2019, 14 pages.
English language translation of Japanese Office Action for Application No. JP2016-563065, dated Sep. 3, 2019, 1 pages.
Office Action dated Aug. 1, 2019 for U.S. Appl. No. 15/606,516 (pp. 1-13).
Office Action dated Feb. 18, 2020 for U.S. Appl. No. 15/606,516 (pp. 1 -13).

* cited by examiner

SECURE MICROFORM

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A content provider has an incentive to accept payments during a purchase transaction on its website. The simplest form of accepting a payment is to receive the user's card number/personal account number (PAN). Recent hacking scandals have highlighted the risk and the potential liability associated with directly handling PANs by a content provider. Related industry standard PCI DSS 3.2 provides content providers a simpler way to field data-security compliant web sites by using third party sites for card data entry. However, content providers are reluctant to turn over control to a third party for collecting account information because the content provider loses control of the customer experience.

This may be illustrated by the use of a common payment service often used in a transaction. The customer is redirected away from the content provider's site to an entirely different website and after completing the entry of the payment data, the customer is redirected back to the content provider site. The content provider has no control over the look and feel of the payment service destination site highlighting to the user the discontinuity in the transaction. Further if an error occurs in either of the redirections or if payment data entry is unconfirmed, the customer is unable to determine where in the process the error occurred or even if the payment was completed.

SUMMARY

In an embodiment, a content provider website embeds a secure iframe into a client's browsing session with the content provider. The iframe uses cryptographic authentication and secure transports to connect to a predetermined web site of a secure service where user's sensitive data is securely collected and a token is generated for use by the content provider to complete the transaction. A token is a value that represents, but is not mathematically related to, the data collected, and can only be used by the content provider. The content provider is able to control the look and feel of the iframe. The user is never redirected away from the content provider website. The connection to the third party is highly robust with respect to man-in-the-middle attacks and cross-site scripting attacks, even in the event that the content provider's website is compromised by a bad actor.

A mandatory HTTPS session is used by the iframe to contact the secure service. The microform uses HTTP Strict Transport Security (HSTS) so that the microform is restricted to contacting the web site of the secure service only via HTTPS, reducing the risk of being redirected from a non-secure HTTP session. The microform may also use public key pinning via HTTP public key pinning (HPKP) to identify a previously provisioned one-time asymmetric key as being associated with the secure service. In this way, even if the Certificate Authority (CA) that has signed the public key certificate is compromised, a bad actor cannot forge the certificate for use with another site. The microform further uses hashes received from the secure service to verify that the microform is instantiated within the intended website, that is "good_guy.com" vs. "bad_guy.com." End-to-end encryption between the microform and the secure service protects data from eavesdropping.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Previous attempts at protecting a content provider from handling sensitive financial information have required that the content provider redirect the user session to another website for completing the entry of payment data. This redirection causes the user to leave the content provider's website and interact with the web presence of another provider, such as any of several secure payment services including Visa Checkout. Content providers may be unwilling to send their customers to another website for several reasons. One involves the simple loss of control of the user session, since content provider has no visibility into what occurred should the user abandon his or her session while at the other site. Another involves the user becoming acutely aware that he or she is no longer at the content provider's website due in part to the content provider's inability to control the look and feel (branding) of the secure payment service provider's website. The content provider would like to give the user the sense that the purchasing session is being seamlessly handled, and avoid both the loss of visibility into the session and the loss of brand control.

The use of the following solution addresses both of the issues associated with redirection of the session while providing for a third party to securely capture the user's financial data. Through the use of the embedded iframe and associated microform, the content provider retains full control of the overall user session in that the microform runs securely inside the content provider's client session. Further, the content provider has control of the look and feel of the iframe through the use of style sheets, e.g., cascading style sheets (CSS).

Figure 1:
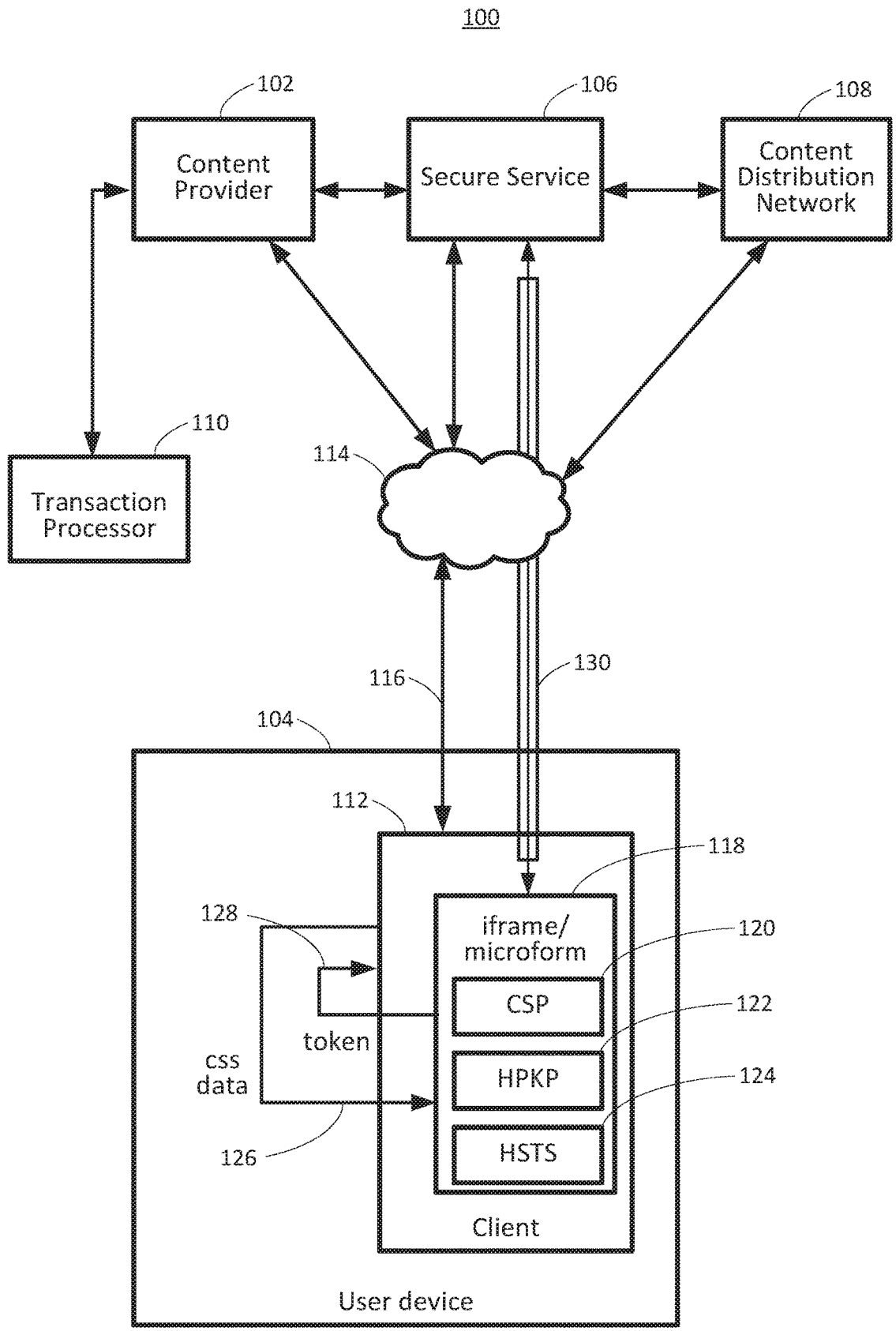
FIG. 1 is a block diagram of a system supporting use of secure microforms in accordance with the current disclosure.

Turning to FIG. 1, a representative system 100 for supporting microforms is discussed and described. The system 100 may include a content provider 102 and a user device 104. The content provider 102 may be any enterprise or agency that provides a good or service or that requires collection of confidential information.

Additional participants in the system 100 may include a secure service 106, a content distribution network 108 and a transaction processor 110. The secure service 106 may be an enterprise or agency that operates on behalf of the content provider 102 to collect information received via an iframe/microform, as described below. The secure service 106 may also perform services related to transaction processing or other related services. In an embodiment, the secure service 106 may be a payment gateway that accepts online transactions in the same way a merchant acquirer accepts in-store purchase transactions. The secure service 106 may also be a token service provider that generates tokens for use in payment transactions instead of actual payment instrument data, such as a personal account number (PAN). In another embodiment, the secure service 106 may request the token on behalf of the PAN from a token service provider (not depicted).

The content distribution network 108 may be used to provide faster response times to a client device request for content, such as a web page or in this case, for an software development kit (SDK) containing code for generation of the iframe. The content distribution network 108 may also be used to download the template iframe code to the client 112. In some embodiments, the content distribution network 108 may be bypassed so that iframe content is served directly from the secure service 106.

The transaction processor 110 may be present in some embodiments. The content provider 102 may send a token received from the secure service 106 to the transaction processor 110 in order to complete a financial transaction. As is known, the token meets the criteria of a personal account number (PAN) of a financial card but, in various embodiments, is limited to use for a certain duration, by a certain merchant or content provider, for a limited amount, another criteria or a combination of these. When the token is presented at a downstream entity, such as a token service provider or issuer, the customer's actual PAN is substituted for the token and the transaction is processed normally. In other embodiments, the secure service 106 may also clear transactions so that transaction processor 110 may not be present.

Communication between the content provider 102 and the user device 104 and, more specifically a client 112 running on the user device 104, may be via a wide area network 114. The wide area network may be the Internet, but other networks may be all or part of an end-to-end communication channel. In various embodiments, a connection 116 between the client 112 and the wide area network 114 may be a wired or wireless connection, such as via a land line telephone, cable network, or cellular data network. Communication between other elements of the system 100, such as between the content provider 102 and the secure service 106 or between the content provider 102 and the transaction processor 110 may be private network connections affording higher security and better protection from intrusion and eavesdropping than a standard connection via the network 114. In an embodiment, these private network connections may be virtual private networks over public networks or dedicated circuits on a point-to-point basis. Connections between the secure service 106 and the content distribution network 108 may also be via private and/or secure networks.

While a transaction forms the background of the events involving an iframe 118, the current disclosure is directed to the use of cryptographic techniques and a combination of Internet constructs to generate an authenticated, secure, and private connection between the iframe 118 and the secure service 106. These techniques are equally applicable to almost any situation where confidential data is collected from a user. The ability to embed the iframe 118 in any web page allows a website operator to outsource collection of data to a third party who may be better equipped to safely store and handle the information. Examples may include a government agency that uses a Social Security Number (SSN) to verify a user. In this instance, the agency may allow another branch of government, even the Social Security Administration, to collect the data and provide a verification to original agency. Another example may be an airline frequent flyer program that may use a microform to collect login information so that the servers associated with the frequent flyer program do not have to be responsible for possibly sensitive data. From these examples, it can be seen that the iframe need not be connected to an entirely different entity, but may simply be a more trusted site within the domain of a single enterprise or agency. The disclosed system and method address the shortcomings of the prior art by securing against known man-in-the-middle (MITM) attacks and cross-site scripting (XSS) attacks even should the content provider's website be infiltrated by a bad actor. These security aspects are achieved while maintaining the user's presence at the content provider's website and while allowing the content provider complete control of the look and feel of the iframe 118.

The client 112, which, in an embodiment is an instance of a browser, may launch an iframe programmed to generate the iframe 118. In an embodiment, the iframe 118 is representative of a secure application that executes inside the client session. The iframe is a convenient and representative construct supporting this form of secure application but this disclosure is not limited to the use of an iframe to implement the techniques described. The iframe 118 may use programming constructs either native to browsers or developed for this application to support its features. These may include content security policy (CSP) 120 for use in detecting and mitigating XSS attacks, HTTP public key pinning (HPKP) 122 for added security against compromised certificate authorities, and HTTP strict transport security (HSTS) for ensuring the use of secure HTTPS protocols between the iframe 118 and the secure service 106. Communication between the client 112 and the iframe 118 allows the client to pass look and feel style data in message 126 to the iframe 118 while allowing the iframe 118 to pass token data up to the client 112 via message 128 for use in completing a transaction via the content provider 102. As will be discussed in more detail below, the iframe 118 establishes an authenticated, encrypted and secured connection 130 with the secure service 106 so that the iframe 118 can collect PAN data from a user, send the PAN data to the secure service 106 and receive a corresponding token from the secure service 106.

Figure 2:
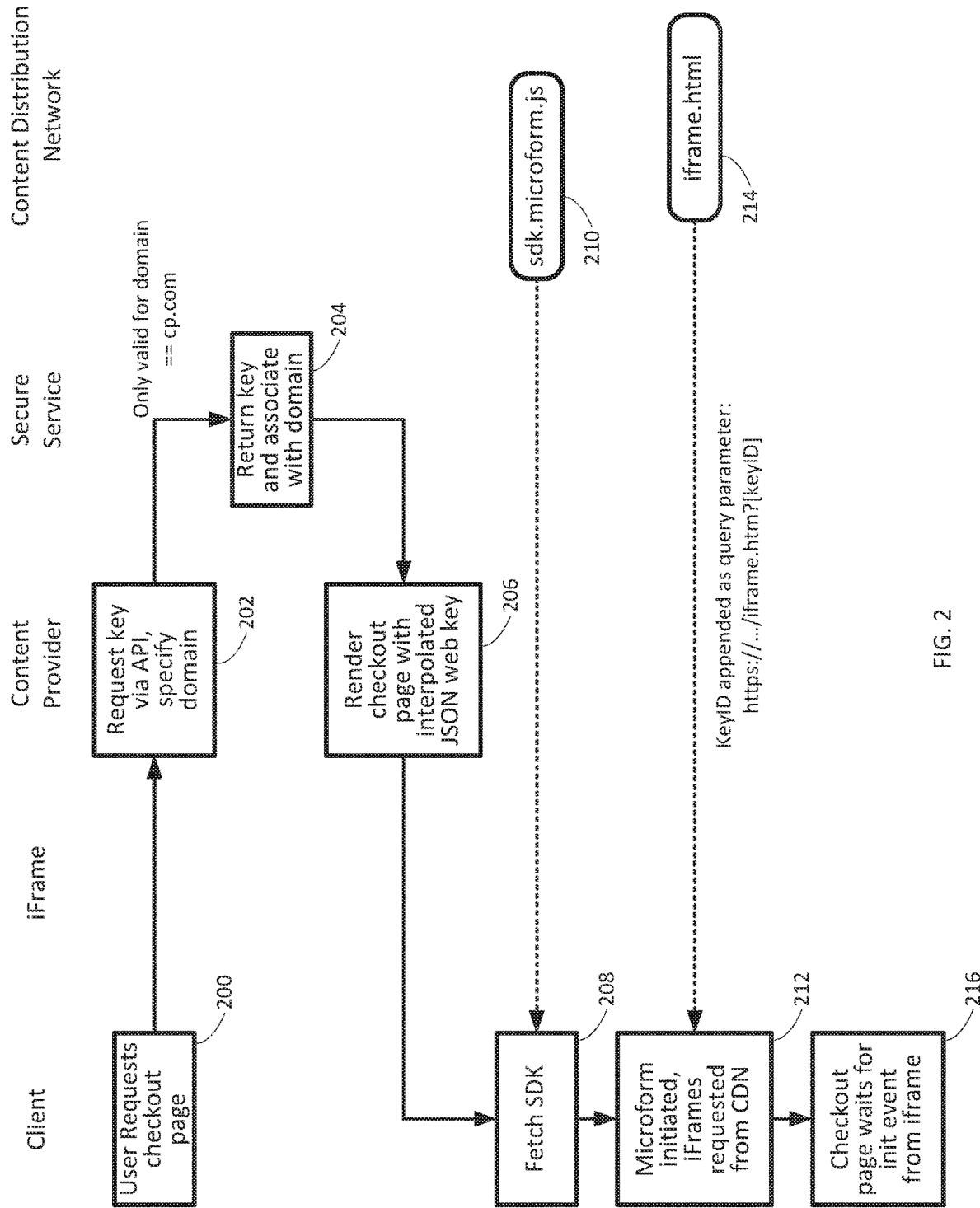
FIG. 2 is a flow diagram illustrating an embodiment of creating and using secure microforms.
Figure 3:
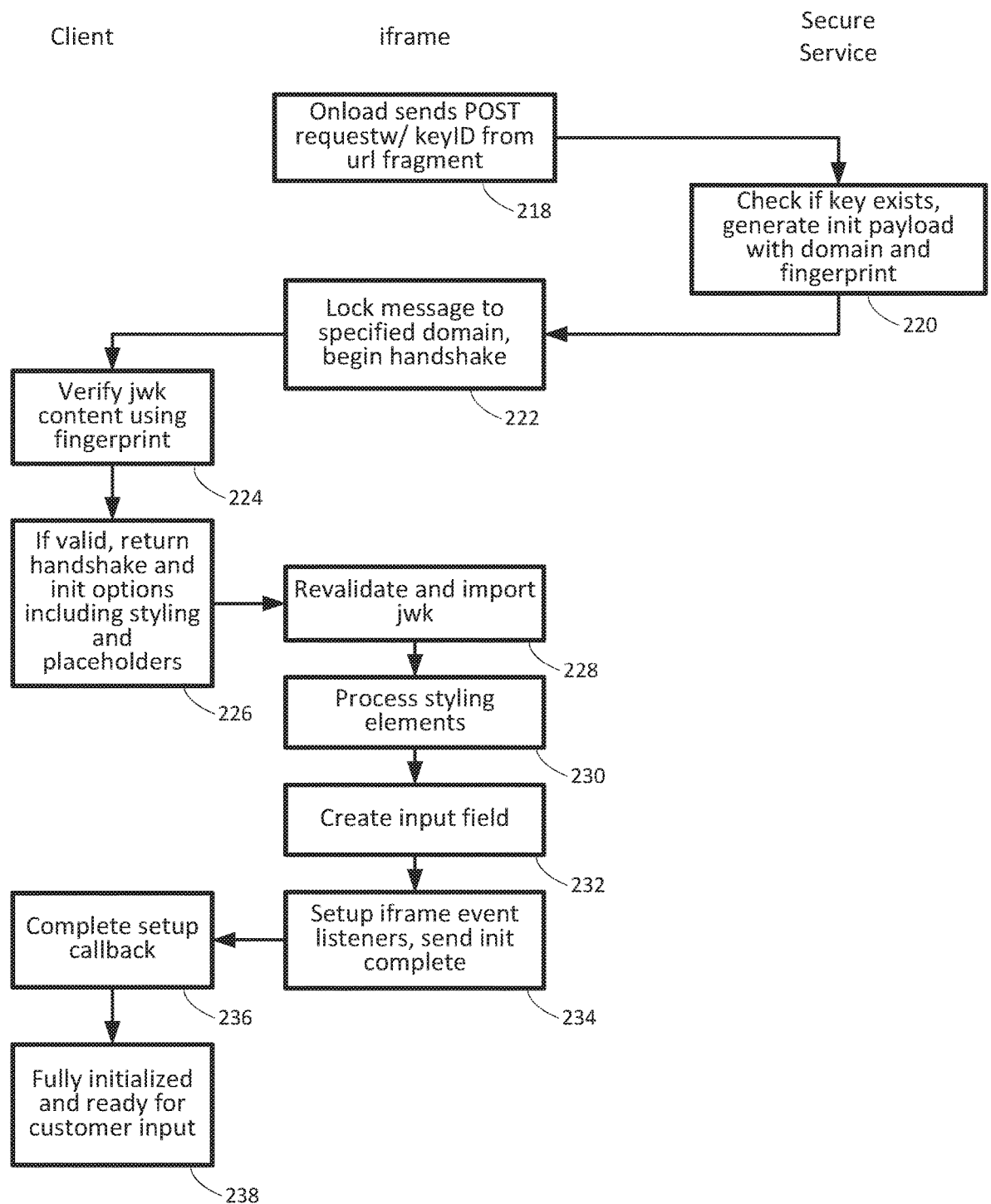
FIG. 3 is a continuation of the flow diagram of FIG. 2.
Figure 4:
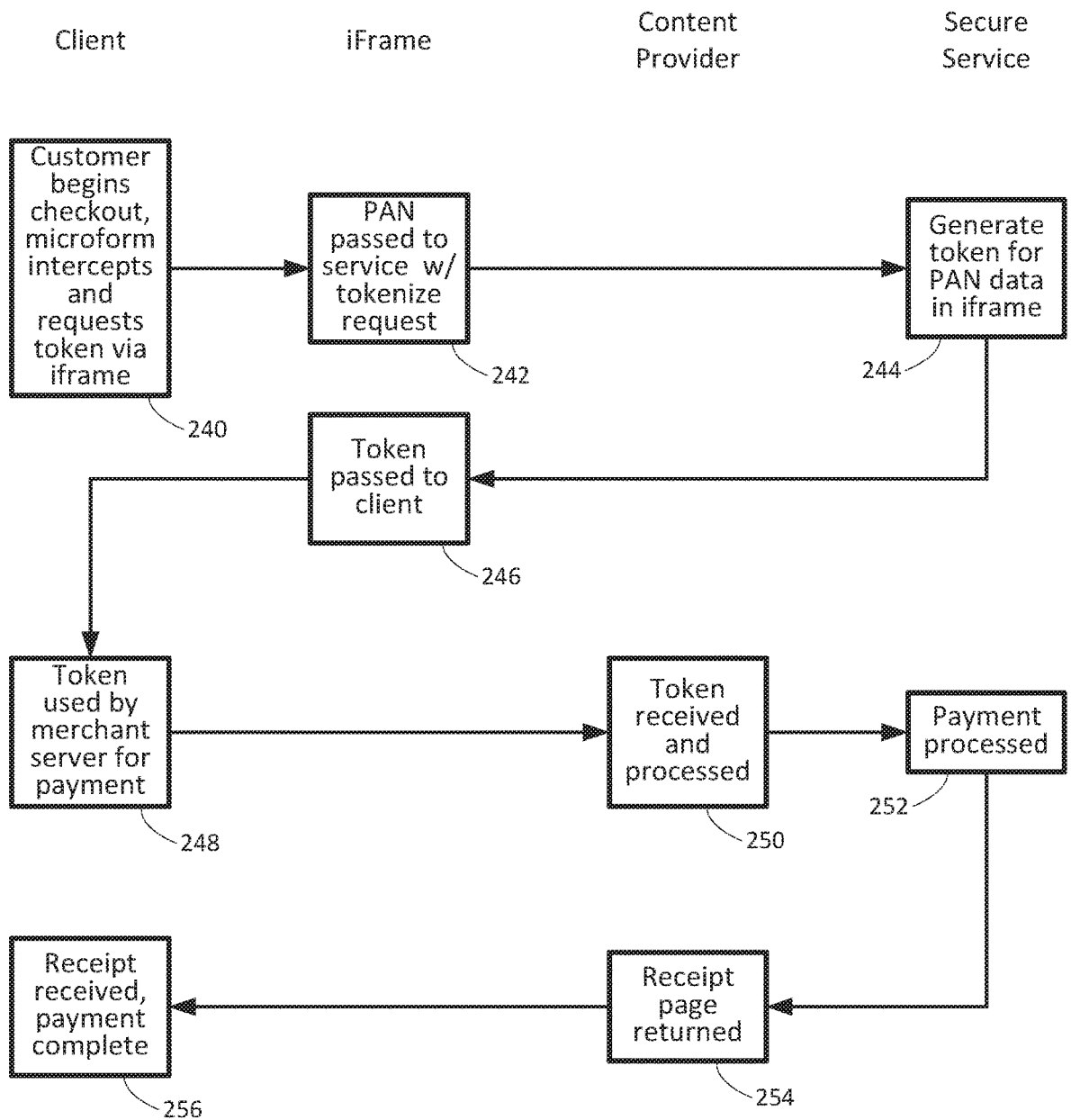
FIG. 4 is a further continuation of the flow diagram of FIG. 3.

FIGS. 2-4 illustrate an exemplary flow diagram for creating and using microforms to securely collect confidential data. The flow diagram illustrates activities at various entities that may participate in the process. While the entities are referred to in broad terms, it will be understood that in practice the entities represent an electronic presence and may be more correctly referred to as domains of each entity. That is, respective functions accessed or triggered through electronic communication, especially World Wide Web communication, are a collection of servers, web pages, and back end-services under the auspices of each respective entity. Domains may be defined by the entity that controls the security for that domain. In that regard, the iframe 118, after being instantiated and initialized may, in an embodiment, be considered an extension of a domain of the secure service 106

In FIGS. 2-4, the entities or domains of the entities are listed from left to right across the top of the figures. Activities performed at each entity are denoted in a column fashion below each respective entity. When an entity does not appear in FIGS. 3-4, it indicates that the entity performs no functions in that figure. The iframe 118 is illustrated in FIG. 2 for context even though it is not a participant in functions represented there. Left to right—the client 112 may be an instance of a browser rendering a web page provided by the content provider 102. An iframe 118 may be an instantiation of the iframe construct generated within the client 112. The content provider 102 or merchant, hosts one or more web pages that are rendered on the client 112. The content provider 102 also interacts with the secure service 106 via, in some embodiments, a network separate from and more secure than the wide area network 114. The secure service 106 interacts with both the content provider 102 and the iframe 118 to support the instantiation and operation of the iframe 118. The content distribution network 108 spreads web content to servers that are physically closer to the user device 104 to improve performance of the overall system 100.

In general, the process of FIGS. 2-4 starts on a checkout page of the website and begins an interaction with the secure service that results in generation of a one-time or short life asymmetric key for use by the client 112 to initialize and secure the iframe 118 and encrypt the PAN received from the user. The secure service 106 returns a token for use by the content provider 102 to complete the transaction.

In detail, beginning at block 200, the client 112 arrives at a checkout page of the website. Upon serving up the checkout page, the content provider 102, at block 202, contacts the secure service 106 to request a key that facilitates the checkout process. The content provider 102 must prove its identity with the secure service 106 using any of a number of authentication techniques, such as a shared secret or a PKI-authentication protocol. In an embodiment, a "generate key" request may be made via the CyberSource Payments API. In this case, the key may be used for more than original function. The key, in an embodiment, is an asymmetric key where the secure service 106 retains one key of the key pair and the second key in the key pair is sent to the content provider 102. A key identifier (keyID) is also generated by the secure service 106 so that the content provider key can be matched to its secure service 106 counterpart during subsequent processing. As is known, asymmetric keys provide for encryption or signing with one key and decryption or verification to be done with the other key. Any asymmetric encryption algorithm may be used, such as RSA or elliptic curve.

At block 204, the secure service 106 generates the public-private key pair and an associated keyID. For the purpose of clarity, we will refer to the private key as an SS key and the public key as a CP key. The secure service 106 associates the generated key pair with a domain of the content provider 102, for example, www.merchant. That is, the secure service 106 will expect any data encrypted with the CP key to arrive from a client 112 accessing content from the content provider 102. Should data be encrypted with the CP key but arrives from another domain, e.g. such as a fictitious website: www.badguy, the data may be rejected at the secure service 106. In an embodiment, such data may be rejected before being decrypted with SS key. In an embodiment, the iframe may be served with a content security policy set to restrict domain access, and may also be served with the jwk embedded. The URI of this frame may include the keyID.

At block 206, the content provider 102 receives the CP key and generates a checkout page including the keyID and optionally the CP key in a JavaScript Object Notation (JSON) data structure known as a JSON web key (jwk). The following is an exemplary payload returned to the content provider 102:

```
{"keys":
    [
        {"kty":"RSA",
        "n": "0vx7agoebGcQSuuPiLJXZptN9nndrQmbXEps2aiAFbWhM78LhWx
4cbbfAAtVT86zwu1RK7aPFFxuhDR1L6tSoc_BJECPebWKRXjBZCiFV4n3oknjhMs
tn64tZ_2W-5JsGY4Hc5n9yBXArwI93Iqt7_RN5w6Cf0h4QyQ5v-65YGjQR0_FDW2
QvzqY368QQMicAtaSqzs8KJZgnYb9c7d0zgdAZHzu6qMQvRL5hajrn1n91CbOpbI
SD08qNLyrdkt-bFTWhAI4vMQFh6WeZu0fM4IFd2NcRwr3XPksINHaQ-G_xBniIqb
w0Ls1jF44-csFCur-kEgU8awapJzKnqDKgw",
        "e":"AQAB",
        "alg":"RS256",
        "kid":"56d5d56dr"
"x5c":
        ["MIIDQjCCAiqgAwIBAgIGATz/FuLiMA0GCSqGSIb3DQEBBQUAMGIxCzAJB
gNVBAYTAIVTMQswCQYDVQQIEwJDTzEPMA0GA1UEBxMGRGRVudmVyMRwwGgY
DVQQKExNQaW5nIElkZW50aXR5IENvcnAuMRcwFQYDVQQDEw5CcmlhbiBDBYW1
wYmVsbDAeFw0xMzAyMjEyMzI5MTVaFw0xODA4MTQyMjI5MTVaMGIxCzAJBg
NVBAYTAIVTMQswCQYDVQQIEwJDTzEPMA0GA1UEBxMGRGRVudmVyMRwwGgYD
VQQKExNQaW5nIElkZW50aXR5IENvcnAuMRcwFQYDVQQDEw5CcmlhbiBDBYW1w
YmVsbDCCASIwDQYJKoZIhvcNAQEBBQADggEPADCCAQoCggEBAL64zn8/QnH
YMeZ0LncoXaEde1fiLm1jHjmQsF/449IYALM9if6amFtPDy2yvz3YIRij66
s5gyLCyO7ANuVRJx1NbgizcAbIIgjtdf/u3WG7K+IiZhtELto/A7Fck9Ws6
SQvzRvOE8uSirYbgmj6He4iO8NCyvaK0jIQRMMGQwsU1quGmFgHIXPLfnpn
fajr1rVTAwtgV5LEZ4IeI+W1GC8ugMhyr4/p1MtcIM42EA8BzE6ZQqC7VPq
PvEjZ2dbZkaBhPbiZAS3YeYBRDWm1p1OZtWamT3cEvqqPpnjL1XyW+oyVVk
aZdkILQp2Btgt9qr21m42f4wTw+Xrp6rCKNb0CAwEAATANBgkqhkiG9w0BA
QUFAAOCAQEAh8zGIfSIcI0o3rYDPBB07aXNswb4ECNIKG0CETTUxmXI9KUL
+9gGIqCz5iWLOgWsnrcKcY0vXPG9J1r9AqBNTqNgHq2G03X09266X5CpOe1
zFo+Owb1zxtp3PehFdfQJ610CDLEaS9V9Rqp17hCyybEpOGVwe8fnk+fbEL
2Bo3UPGrpsHzUoaGpDftmWssZkhpBJKVMJyf/RuP2SmmaIzmnw9JiSIYhzo
4tpzd5rFXhjRbg4zW9C+2qok+2+qDM1iJ684gPHMIY8aLWrdgQTxkumGmTq
gawR+N5MDtdPTEQ0XfIBc2cJEUyMTY5MPvACWpkA6SdS4xSvdXK3IVfOWA=="]
        }
    ]
}
```

Of note are the "kty" or key type value indicating the key is an RSA key, "n" is the value of the key, and "kid" is the key identifier. The "x5c" value is an encoded CP key in X.509 format, which may be used by the content provider 102 to verify the response from the secure service later in the flow.

The client 112 receives the checkout page and begins the rendering process at block 208. Part of this process involves fetching JavaScript code from the content distribution network 108 at block 210. The JavaScript code is in the form of a software developer kit (SDK)/application program interface (API). At block 212, under the direction of code from the SDK, the iframe 118 and associated microform is created with code for the iframe downloaded, optionally from the CDN 108 at block 214. In another embodiment, the iframe may be downloaded from the content provider without the use of a CDN. The SDK replaces specific document object model (DOM) elements of the content provider's page with the iframe served by the secure service 106.

Part of the download at block 214 may be a URI that includes the keyID as a query parameter. This keyID may be used to identify the content provider and to set the specific Content Security Policies (CSP), and later to identify the SS key, both within the secure service 106. The CSP header is sent as a part of the iframe 118 code. The CSP header specifies domains that the client 112 may use as valid sources of scripts. By limiting script execution to the secure service 106 and possibly the content provider 102, cross-site scripting (XSS) attacks can be mitigated. Use of CSP in combination with the HSTS setting helps mitigate packet sniffing attacks. As the iframe continues its initialization, the client 112, at block 216, waits pending an event from the iframe signaling that it is ready to communicate.

Turning to FIG. 3, the process may continue at block 218. The iframe is instantiated with a requirement for Hypertext Strict Transport Security (HSTS). The use of HSTS requires that all communication with the iframe use encrypted transport using HTTPS, preventing a redirection attack from a non-secure source. The iframe 118 then posts a message to the secure service 106 providing the keyID transmitted that was received in the iframe URI.

At block 220, the secure service 106 may check that the keyID exists, and that the matching SS key is valid, for example, confirming that the time for the key validity has not expired. The secure service 106 may then generate an initial payload containing the content provider domain and CP Key fingerprint for the iframe 118. The fingerprint may be a SHA256 hash of the CP key. The fingerprint will be used to authenticate future communications between the iframe 118 and the content provider 102. This ensures the iframe 118 can only communicate with a legitimate client 112.

When the iframe is initialized, at block 222, the iframe is locked to the secure service 106 domain and communication is established with the client 112. The client 112 collects the fingerprint from the iframe and uses that to validate the CP received from the content provider 102 at block 206. The confirmation at block 224 of the fingerprint from the iframe as matching the CP fingerprint assures the client 112 that the iframe 118 is in the trust domain of the secure service 106 and that it is safe to have further communications with the iframe 118.

After confirming the fingerprint, at block 226 the client 112 responds to the iframe 118 with further initialization data that include the CP, style and placeholder information, such as cascading style sheets or other look and feel elements. See, e.g., message 126 of FIG. 1. At block 228, the iframe 118 confirms the CP received from the client 112 by comparing the CP fingerprint with the fingerprint received from the secure service 106 at block 222. If the validation succeeds, the iframe 118 is assured that the client 112 received the CP from the secure service 106. Execution may continue at block 230, where the iframe 118 processes the styling elements received from the client 112 to format the iframe, which eventually, at block 232 creates a visible input field on the display of the user device 104, within the domain of the client 112.

The iframe 118 may then, at block 234 send a message to the client 112 that the initialization in complete and that the iframe 118 is ready to receive data, particularly, the details of the financial instrument chosen by the user. The client at block 236 confirms the message from the iframe 118 and waits for user input at block 238.

Turning to FIG. 4, as the user enters data into an input field or microform of the iframe 118 at block 240, the user may not be aware that he or she is not entering data directly into a form of the content provider 102. One reason for this conclusion may be that the input field or microform may be as small as a single text entry box, but even if multiple fields for PAN, expiration date, CVV or other data are entered, the fields appear to be completely within the content provider website as displayed via the client 112. Another reason for the user's perception may be that the style may exactly match the non-microform elements of the page, if so desired by the content provider 102. The style matches may include borders, background colors, font type, font size, font color, cursor shape, etc.

In this embodiment, the secure service 106 has established a secure connection with the iframe 118, the client 112 has authenticated the iframe 118 and the iframe 118 has authenticated the client 112. As the iframe 118 collects the PAN and other data at block 242, the information being passed to the secure service 106 is encrypted with the one-time CP, and due the nature of the cryptography, only the secure service 106 can decrypt the PAN. The session is secured from eavesdropping using HTTPS due to the initialization with HSTS set. The session is also protected from known man-in-the-middle attacks through the use of end-to-end encryption facilitated by the CP/SS key pair.

The secure service 106 receives the PAN and other data and generates a token to substitute for the PAN in the completion of the transaction at block 244. The token may be digitally signed using the SS, by security service 106. The token and accompanying digital signature are returned to the iframe 118 and, at block 246, is passed up to the client 112. See, e.g., message 128 of FIG. 1. The client 112 then uses the token to complete the transaction by passing the token to the content provider 102. The integrity of the token may be validated by content provider using the CP. The content provider 102, at block 250, processes the token in a standard fashion and passes the token to the secure service 106 at block 252. Alternatively, the content provider 102 may complete the transaction through another processor 110 using a token service provider (not depicted) that is in touch with the secure service 106 for the token to PAN matching.

At block 252, the secure service 106 may process the request and return the response data to the content provider 102. In various embodiments, more than just payment data may be supported via the communication with the secure service. For example, request may be related to PAN validation for fraud services, loyalty system information or others. The content provider 102, at block 254 may receive the payment data, release the content being purchased, and generate a receipt. The receipt is received at the client 112 at block 256 and the transaction is complete.

Figure 5:
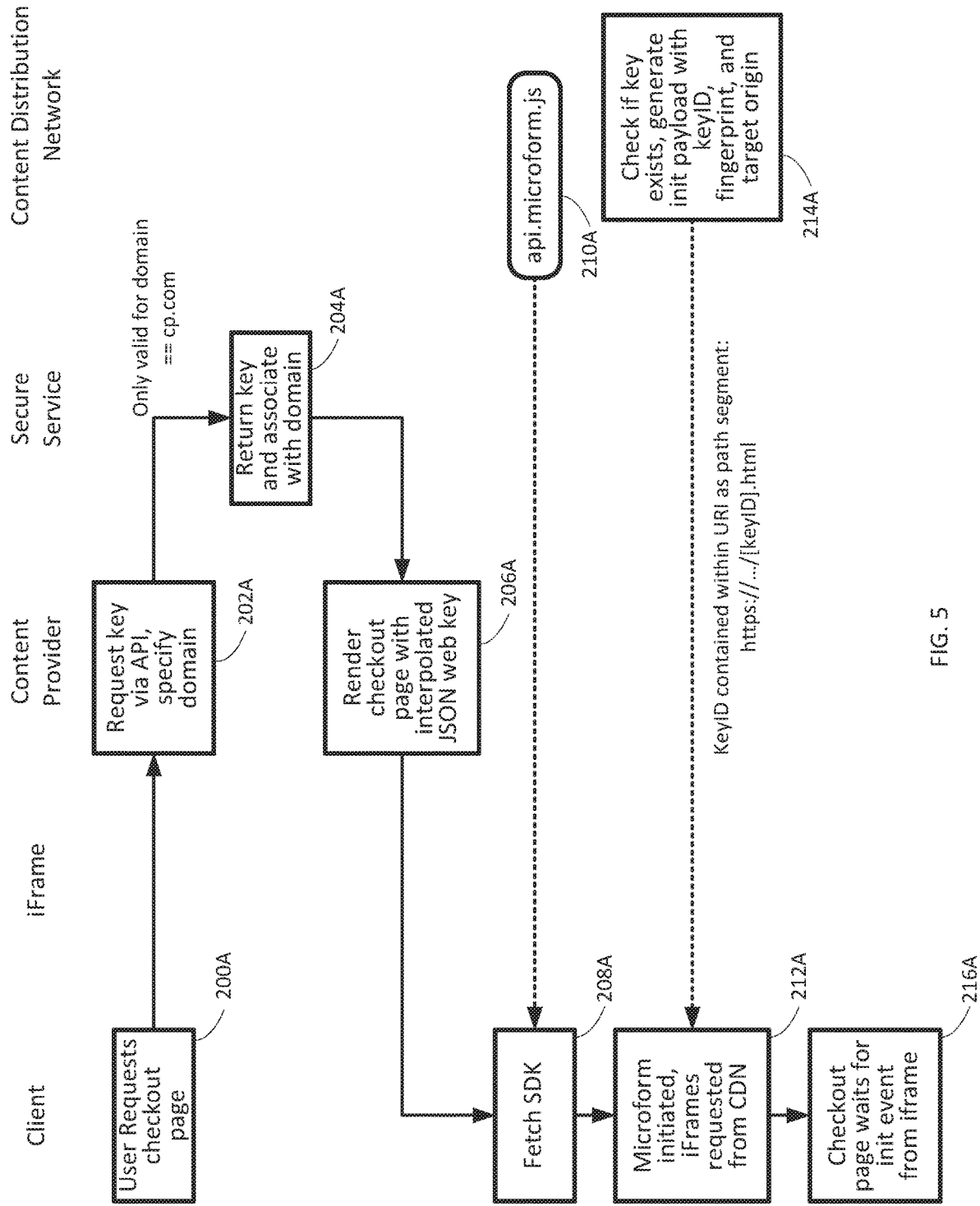
FIG. 5 is a flow diagram of an alternate embodiment of creating and using microforms.

The procedure described above allows a static iframe (with dynamic CSP HTTP header) to be downloaded with initialization occurring after receipt at the client/iframe. An alternate embodiment illustrated in FIGS. 5-6 uses dynamic content in the iframe download to reduce the initialization steps at the iframe. As opposed to appending the keyID as a query parameter in the request between blocks 214 and 212 as illustrated in FIG. 2, FIG. 5 uses the keyID as the actual iframe document name, between blocks 212A and 214A.

Figure 6:
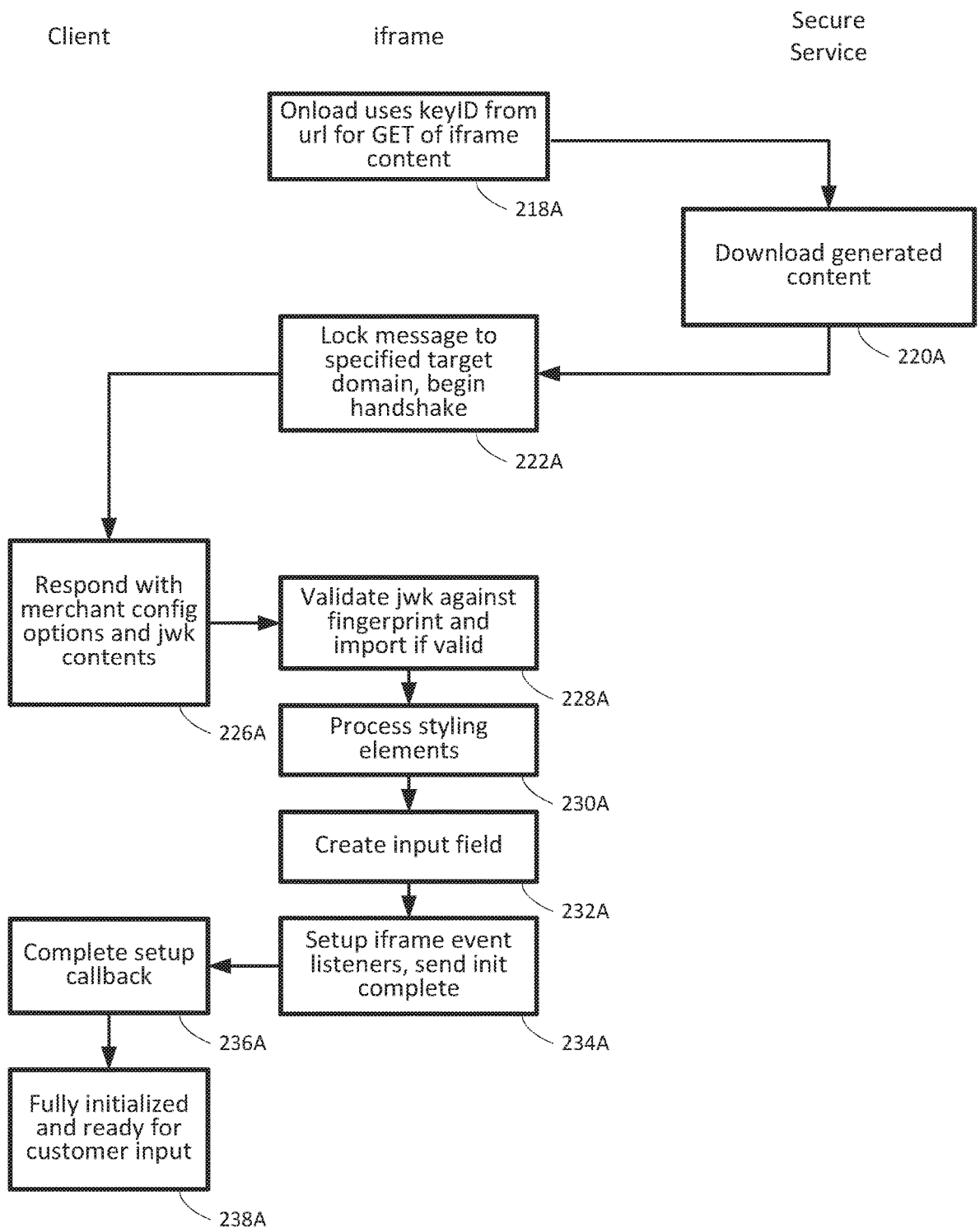
FIG. 6 is a continuation of the flow diagram of FIG. 5.

In this embodiment a static HTML iframe is not modified by a keyID, but rather a unique page is dynamically delivered with the keyID being part of the actual HTTP URI and the corresponding CP, CSP and content provider 112 domain embedded within the page from inception. As shown in FIG. 6, at blocks 222A the iframe 108 locks communication to the client 112, and begins the handshake process. In block 228A the CP fingerprint is validated. The flow following block 228A is the same as that found in FIG. 4.

Should an error occur anywhere in the data collection and communication process with the secure service 106, the iframe 118, in communication with the client 112 is in a position to report exact error details. This means that the content provider 102 or even the user is, firstly, aware of the problem and, secondly, may be in a position to take a corrective action. For example, if the secure service 106 is unreachable at block 204, an error may be thrown early in the process by the content provider 102. At any point in the process, the client 112 or the iframe 118 is in a position to monitor progress against an expected next step/outcome and report the error up the chain. This provides a level of control not found when using redirection to a third party site for the purpose of secure data collection.

At least one technical effect of the process described above is the generation of a secure iframe 118 within the client 112/browser of a user's session with a content provider 102. The content provider is able to retain the user at its own website while still enjoying the benefits of secure collection of sensitive data and the tokenization process. Another technical effect is the actual sequence of startup events that secure the iframe/microform from eavesdropping and man-in-the-middle attacks over a public network.

A system and method in accordance with the current disclosure benefits both content providers and people who perform transactions on via web browsers. A content provider 102 avoids the risks associated with collecting and storing PANs while benefitting from keeping the user on its website. The content provider 102 also benefits from being able to preserve its brand identity by retaining control of the look and feel of the iframe/microform being hosting inside its web presence at the user device 104. The user benefits from reduced chance of data theft through end-to-end encryption, even when the network they use is compromised. Furthermore, their sensitive data is securely transformed into a token so that the user's exposure profile is significantly reduced. The user also benefits by not being handed off to another website for entering payment data. Remaining on the content provider website through the use of the microform avoids the prior art process of redirection to a payment site, data collection, and return redirection to the content provider site and the errors and frustration associated with those steps.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method of merging secure and unsecure content in a media presentation for securely collecting sensitive payment information, the method comprising:

generating, by a content provider, a web content for display at a client device;

authenticating the content provider at a secure service using a pre-existing cryptographic authentication protocol;

generating, at a secure service, a key pair including a public key and a private key and a keyID responsive to a request from the content provider;

associating, at the secure service, the key pair and keyID with a domain of the content provider so that the key pair is only valid for communication between the secure service and the domain of the content provider and is also valid only for a limited time;

receiving data for activating an iframe represented by a secure application at the web content, the data received via a network, the data including the keyID;

activating the secure application at the client device using the data received via the network;

sending a validation request from the secure application to the secure service, the validation request including the keyID;

confirming the secure application at the secure service, in part by matching the domain of the content provider associated with the keyID with a domain associated with the validation request;

receiving, at the secure application, a validation response to the validation request, the validation response containing a fingerprint for use in validating the secure service;

limiting further communication from the secure application to only the secure service;

passing the fingerprint from the secure application to the web content;

validating the fingerprint at the web content;

responsive to validating the fingerprint at the web content, sending style information from the web content to the secure application for use by the secure application in displaying content, wherein the style information is controlled by the content provider;

receiving, at the secure service, input data received via the secure application;

generating, at the secure service, a token based on the input data; and returning the token to the web content via the secure application.

2. The method of claim 1, wherein the secure service provides an HTTP Strict Transport Security (HSTS) service, the secure application limited to communication via HSTS.

3. The method of claim 1, wherein the public key is transported from the secure service to the content provider in a JSON web key.

4. The method of claim 1, further comprising pinning, at the secure application, the public key to the secure service using HTTP public key pinning (HPKP).

5. The method of claim 1, further comprising using, at the secure application, the style information to conform displayed elements of the secure application to a style of the web content.

6. The method of claim 1, wherein receiving the data for activating the secure application at the web content comprises receiving the data via the network from a content distribution network (CDN).

7. The method of claim 1, encrypting the input data with the public key at the secure application prior to sending the input data to the secure service.

8. The method of claim 7, wherein the input data includes a personal account number of a payment instrument.

9. A method for collecting secure data and sensitive payment information from a website, the method comprising:
providing a content provider domain that serves web content, a user device communicatively coupled to the content provider domain, the user device rendering the web content received from the content provider domain, the web content including a first web content and an iframe hosted within the first web content, and a secure service domain coupled to the content provider domain and the user device;
generating a keyID and a key pair including a public key and a private key at the secure service domain responsive to a request from the content provider domain;
associating, at the secure service, the key pair and keyID with a domain of the content provider so that the key pair is only valid for communication between the secure service and the domain of the content provider and is also valid only for a limited time;
providing the public key to the iframe from the secure service domain;
restricting access of the iframe to only the secure service domain and the first web content;
sending style information from the first web content to the iframe in order to display contents, wherein the style information is controlled by the content provider;
receiving confidential data at the iframe via a user interface of the user device;
encrypting the confidential data using the public key;
transporting the encrypted confidential data from the iframe to the secure service domain;
returning, from the secure service domain, to the iframe a token corresponding to the encrypted confidential data together with a digital signature of the token created with the private key;
passing the token from the iframe through the first web content to the content provider domain; and
verifying an integrity of the token using the public key.

10. The method of claim 9, further comprising passing display and style information from the first web content to the iframe for use by the iframe in displaying iframe content embedded in the first web content.

11. The method of claim 9, further comprising:
pinning an iframe secure socket layer (SSL) certificate to the secure service domain; and
using the iframe SSL certificate to perform payload end-to-end (e2e) encryption wherein the iframe SSL certificate is rotated after a prescribed number of uses.

12. The method of claim 9, wherein restricting access of the iframe to the secure service domain comprises sending a content security policy directive to the iframe from the secure service domain.

13. The method of claim 9, further comprising:
sending the keyID generated at the request of the content provider to the secure service domain; and associating the keyID with the content provider domain.

14. The method of claim 13, further comprising pinning the public key to the secure service domain using an HTTP public key pinning directive.

15. The method of claim 9, wherein generating the public key comprises generating an asymmetric key responsive to the request from the content provider domain, the asymmetric key having a fixed duration lifespan.

16. The method of claim 15, wherein the fixed duration lifespan of the asymmetric key is less than 1 hour.

17. The method of claim 15, wherein the asymmetric key is a limited use key for encryption of the confidential data.

18. The method of claim 9, wherein establishing the HTTPS session between the iframe and the secure service domain comprises requiring the HTTPS session using an HTTP Strict Transport Security (HSTS) service directive.

* * * * *